United States Patent [19]

Masuda et al.

[11] Patent Number: 4,954,942
[45] Date of Patent: Sep. 4, 1990

[54] SOFTWARE DEBUGGING SYSTEM FOR WRITING A LOGICAL ADDRESS CONVERSION DATA INTO A TRACE MEMORY OF AN EMULATOR

[75] Inventors: Satoshi Masuda, Sayama; Ikuya Kawasaki, Tokyo; Shigezumi Matsui, Kodaira, all of Japan

[73] Assignee: Hitachi Ltd., Tokyo, Japan

[21] Appl. No.: 272,757

[22] Filed: Nov. 17, 1988

[30] Foreign Application Priority Data

Nov. 20, 1987 [JP] Japan .................. 62-293809

[51] Int. Cl.⁵ ............ G06F 9/455; G06F 12/10; G06F 11/28
[52] U.S. Cl. .................. 364/200; 364/231; 364/231.31; 364/232.3; 364/240; 364/239.9; 364/244.7; 364/255.8; 364/256.6; 364/259.6; 364/260.4; 364/280.4
[58] Field of Search .................. 364/200, 900; 371/16, 371/19

[56] References Cited

U.S. PATENT DOCUMENTS 4,218,743 8/1980 Hoffman et al. ................... 364/200
4,574,351 3/1986 Dang et al. .......................... 364/200
4,636,940 1/1987 Goodwin, Jr. ..................... 364/200

OTHER PUBLICATIONS

"Virtual Address Trace Mechanism", Greer et al., IBM Technical Disclosure Bulletin, vol. 26, No. 2, Jul. 1983.
"Nikkei Electronics", Nikkei McGraw-Hill, No. 414, Feb. 9, 1987, pp. 101-102.

Primary Examiner—Archie E. Williams, Jr.
Assistant Examiner—Ayni Mohamed
Attorney, Agent, or Firm—Fay, Sharpe, Beall, Fagan, Minnich & McKee

[57] ABSTRACT

The microprocessor has an address converting buffer to convert logical addresses into physical addresses and a signal generator representing the timing for the microprocessor to retrieve conversion information from an external memory and write it into the address converting buffer. With this configuration, it is possible to determine the logical address from the physical address that was output to an external circuit, without the microprocessor outputting the logical address directly to the external circuit.

1 Claim, 5 Drawing Sheets

SOFTWARE DEBUGGING SYSTEM FOR WRITING A LOGICAL ADDRESS CONVERSION DATA INTO A TRACE MEMORY OF AN EMULATOR

BACKGROUND OF THE INVENTION

This invention relates to a data processing device that incorporates an information converter, such as a microprocessor with a built-in address converter buffer and more particularly to a technique that can be effectively applied for debugging software in a data processing system equipped with such a microprocessor.

As application programs and control programs improve the level of performance and have more versatile functions, the data processing systems that execute such programs are substantially increasing their address space. In data processing systems that perform large-scale multitasks, it is desired that programs and data be protected against illegal accesses which could destroy them. For this purpose, a virtual memory access method is used on such data processing systems.

The virtual memory access method uses an address converter—a memory management unit equipped with an address converting buffer—which defines the correspondence between physical addresses and logical addresses to correlate the virtual memory space, which is represented by logical addresses according to architecture, with the real memory space that exits as hardware and is referred to by physical addresses.

If such an address converter is incorporated in a microprocessor, the microprocessor produces a physical address to the outside world and does not directly output a logical address. Therefore, in debugging software of the data processing system that uses such a microprocessor, the logical addresses necessary for such program debugging cannot be monitored outside the microprocessor.

For debugging software in the abovementioned data processing system, a method is available which is introduced by "Nikkei Electronics" (No. 414), page 101 and 102, published from Nikkei McGraw-Hill on Feb. 9, 1987. This method is briefly explained below.

In addition to a microprocessor as a real chip, the term real chip refers to the microprocessor being used in the system during normal operations, that has an address converter and which outputs a physical address converted by the address converter, another microprocessor is prepared which is dedicated only for evaluation and which can output to external circuits a logical address before being converted. These two microprocessors are parallelly operated performing emulation while at the same time accumulating as trace information the logical addresses together with various kinds of bus information and control information.

However, the above method has the following problems. That is, it needs a dedicated microprocessor for evaluation to perform debugging of software of the data processing system, which has a microprocessor with a built-in address converter. Moreover, since the dedicated evaluation microprocessor must be run in parallel with the real chip microprocessor which outputs physical addresses, the emulator circuit configuration and its control actions become complicated.

OBJECTS OF THE INVENTION

The object of this invention is to provide a data processing device suited for operation analysis.

Another object of the invention is to provide a microprocessor suited for debugging software.

A further object of the invention is to provide a microprocessor which is suited for debugging software without requiring a substantial increase in the number of external terminals.

A still further object of the invention is to provide a data processing device which, without directly outputting internal information before being converted by an information converter, can derive internal information from information that was translated from the internal information and output to external circuits. Still another object of the invention is to provide a data processing system which can perform emulation for the microprocessor without a need for a special evaluation microprocessor. A further object of the invention is to provide a data processing system with a simple configuration. These and other objects and features of this invention will become apparent from the following description taken in connection with the attached drawings.

SUMMARY OF THE INVENTION

The data processing device of the invention has a conversion table which contains rewritable conversion information including external information such as physical addresses supplied from an external memory. The data processing device also incorporates an information converter such as an address converter that refers to or consults the conversion table, converts internal information such as logical addresses into external information such as physical addresses and then outputs the converted physical addresses to external circuits. The information converter outputs to external circuits a signal specifying the access timing at which to access the external memory in setting conversion information in the conversion table. The information converter such as an address converter may, for example, be a memory management unit that has an address converting buffer.

The above information converter works as follows. When the external memory is to be accessed to get pertinent conversion information and set it in the information converter such as an address converter, the data processing device outputs a signal specifying the access timing to external circuits. The timing for accessing the memory to set the conversion information in the information converter can be identified from this signal. In response to the access timing signal, the information including the conversion information set in the information converter is also stored externally and, based on the externally stored information, it is possible to generate a table for reconverting into internal information such as logical addresses the converted information such as physical addresses that were output to external circuits by the information converter. By reconverting the trace result of converted information that was output to external circuits, it is possible to derive the internal information that was present before being converted by the information converter, without directly outputting the preconversion internal information to outside of the data processing device. Because the logical address is not directly output to external circuits, a large increase in the number of external terminals of the data process-

DETAILED DESCRIPTION OF THE PREFERRED EMBODIMENT

Figure 1:
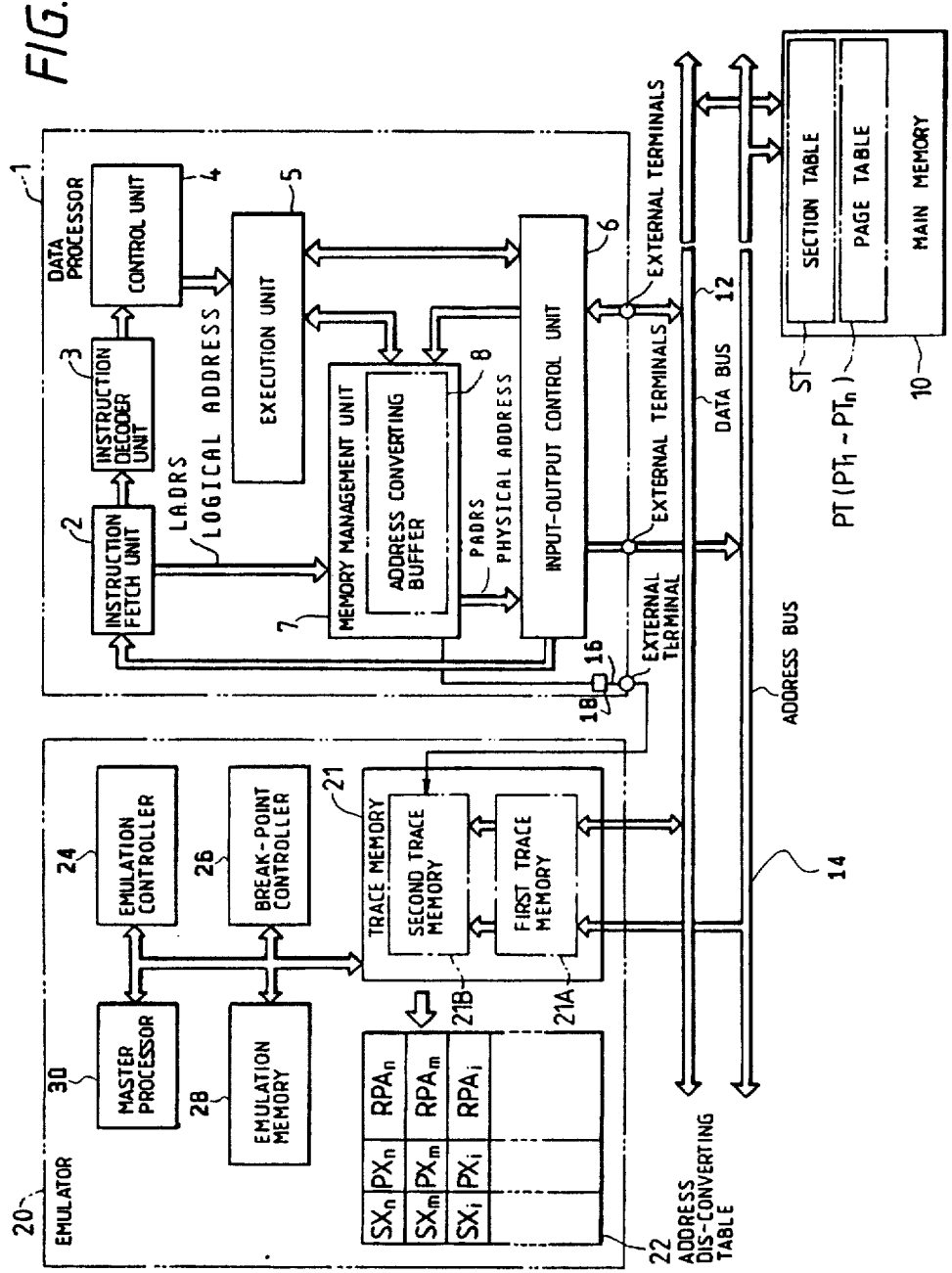
FIG. 1 is a block diagram for a data processing system including a data processor, an embodiment of the data processing device according to the invention.

FIG. 1 shows a block diagram for the data processing system including a data processor, an embodiment of the data processing device according to this invention.

The data processing system of FIG. 1 is so configured to debug a user system developed by a user. In the figure, the data processor 1 is a processor for emulation which is mounted in a user system in place of the user system's microprocessor (target processor) in order to debug the user system. In this embodiment, the emulation processor 20 is mounted on the emulator side, not on the user system side, and is connected to the user system through a cable, though this arrangement may be otherwise. A main memory 10 is, though not limited to, a memory contained in the user system or an emulation memory contained in the emulator.

In FIG. 1, a data bus DB 12 and an address bus AB 14 that connect the data processor 1, the emulator 20, and the main memory 10 with each other are shown with no distinction between the interface cable connecting the emulator and the user system and the system bus in the user system. And the data bus DB 12 and the address bus AB 14 show how the data processor 1, emulator 20 and main memory 10 are interconnected. The main memory 10 is made up of, though not limited to, a plurality of semiconductor storage devices.

The data processor (microprocessor) shown in FIG. 1 is formed on, though not limited to, a semiconductor substrate which is manufactured by a known semiconductor IC technology. That is, each circuit block contained in a two-dot line box is formed on one semiconductor substrate by the semiconductor IC technology.

The data processor 1 consists of, though not limited to, an instruction fetch unit 2 that prefetches a macro instruction from the main memory 10, an instruction decoder unit 3 that decodes an operation code of the fetched macro instruction; a control unit 4 which reads a series of micro instructions according to the address information output from the instruction decoder unit and, according to the read micro instructions, generates various control signals; an execution unit 5 which performs arithmetic operations on the operands in the macro instruction according to the control signals output from the control unit 4; a memory management unit 7 that performs address conversion when accessing the external memory 10; and an input/output control unit 6 which performs an input/output control on the macro instructions, operands, address signals and various other interface signals.

The memory management unit 7 has a conversion table such as an address converting buffer 8 to convert a logical address (virtual address) LADRS—which is contained in the address specification field in a macro instruction fetched by the instruction fetch unit 2—into a physical address (real address) PADRS. In addition to the address conversion function, the memory management unit 7 of this embodiment has a protective function to protect the external memory against illegal access. That is, when the external memory is accessed, a check is made of whether the access being made is to the access-permitted memory area, thereby preventing an illegal access to other than the specified memory areas.

The logical address space that the data processor of this embodiment has is divided into n sections, each further subdivided into n page frames.

Figure 2:
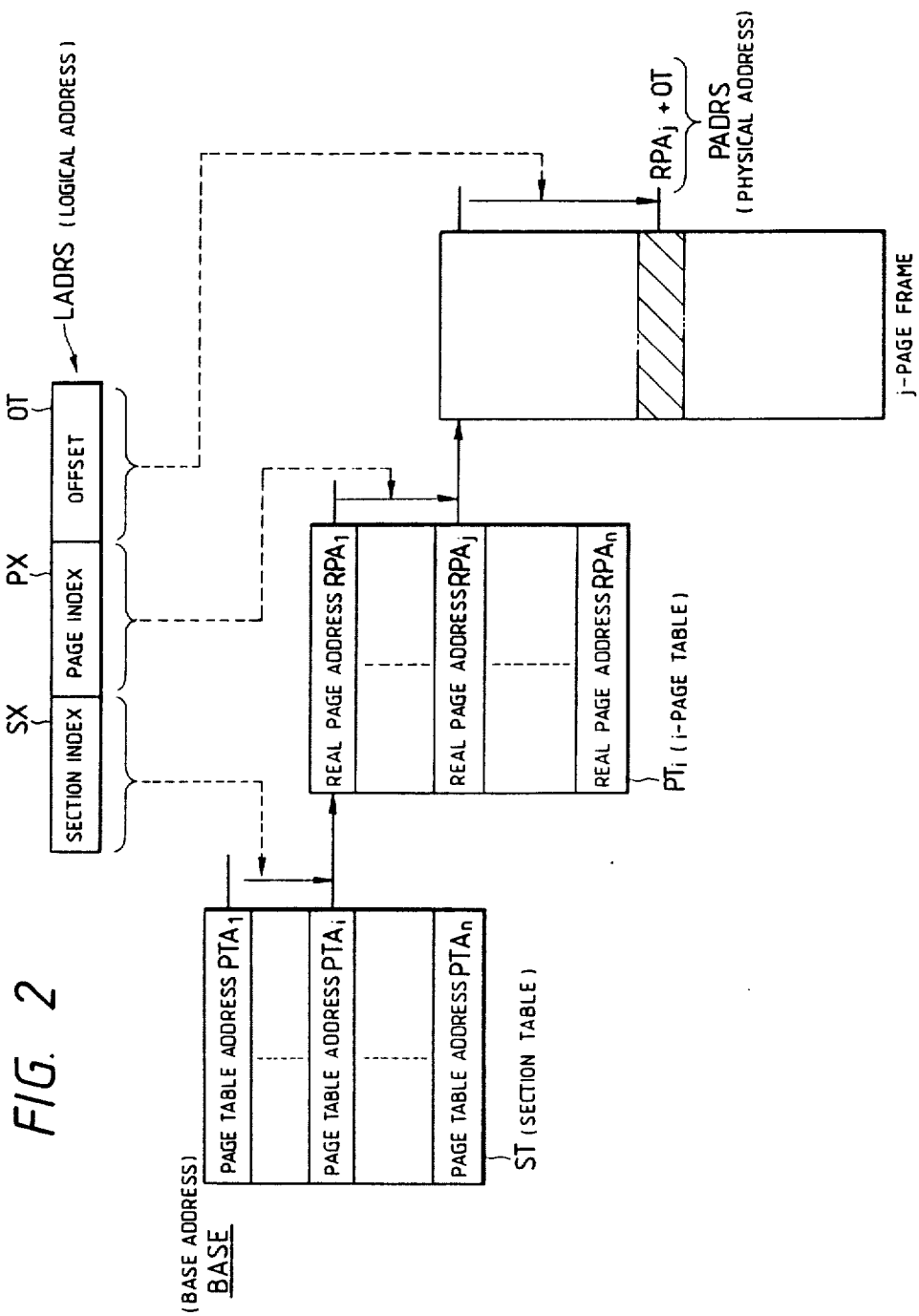
FIG. 2 is a diagram showing the process of converting logical addresses into physical addresses by the address convertor incorporated in the data processor.

The logical address LADRS, as shown in FIG. 2, consists of a section index SX to specify a desired section number from among a plurality of sections, a page index PX to specify a desired page frame number from among a plurality of page frames, and an offset OT to specify a desired location in the specified page frame as counted from the start of the page frame. In the main memory 10 a section table ST and page tables PT (PT1, . . . , PTn) used for address conversion are formed in advance by a program. The section index SX and the page index PX contained in the logical address LADRS are reference or search information used to make a search over conversion information table entries set in the address converting buffer 8. The section index SX and the page index PX also specify the memory locations in the section table ST and the page table PT formed in the main memory 10 where pertinent information is stored.

In the section table ST in the main memory 10 are stored a series of page table addresses PTA (PTA1, . . . , PTAn) that correspond to the start addresses of each page table PT. The section index SX in the logical address LADRS represents an offset address information that specifies the offset from the base address BASE of the section table ST (e.g., the start address of the section table ST) to the location where an address of a desired page table is stored.

Each of the page tables PT contains a series of real page addresses RPA (RPA1, . . . , RPAn) each of which corresponds to the start address of each page frame. To take a page table PTi as an example, the page index PX in the logical address LADRS represents an offset address that specifies the offset from the start address of the page table PTi to the location where a real page address of a desired page frame is stored. Now, we will explain, with reference to FIG. 2, the process of converting the logical address LADRS into the physical address PADRS by using the section table ST and the page tables PT in the main memory 10.

As mentioned earlier, the section index SX contained in the logical address LADRS has an offset address information specifying the offset from the base address BASE. Hence, by adding the offset address given by the section index SX to the base address BASE, a location in the section table ST is determined where a page table address, say PTAi, that is specified by the section index SX is placed. Next, the page index PX contained in the logical address LADRS is used as an offset address information with respect to the page table address PTAi of the page table PTi to determine a real page address, say RPAj, corresponding to the page index PX. That is, by adding the offset address given by the page index PX to the page table address PTAi, a location in the page table PTi is determined where a real page address specified by the page index PX, say RPAj, is placed. The real page address RPAj thus obtained is then added with the offset OT contained in the logical address LADRS to determine a physical address PADRS which corresponds to the logical address LADRS. Now, the converted physical address PADRS is used as an address signal to access the hatched memory location in the jth page frame placed in the real memory space.

Figure 3:
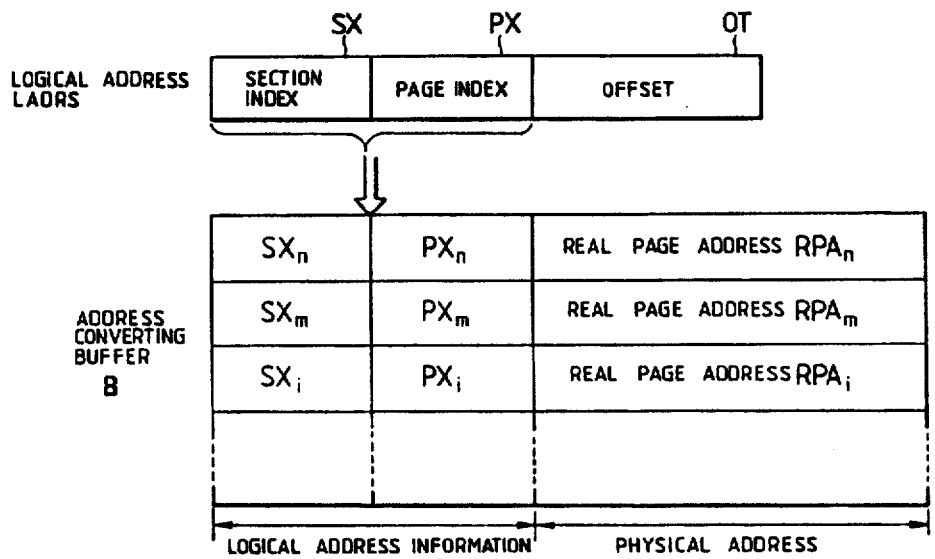
FIG. 3 is a diagram showing the rough configuration of conversion information to be set in the address conversion buffer contained in the address convertor.

The address converting buffer 8 provided in the memory management unit 7 is a conversion table by which to search the real page address RPA corresponding to the logical address LADRS. As shown in FIG. 3, the address converting buffer 8 contains a plurality of paired address sections, each pair consisting of a logical address section and a physical address section. In the logical address sections is stored a series of section indices SX and page indices PX, which from the internal information table entries that are searched over by using the search or reference information in the logical address LADRS. In the physical address sections is stored a series of real page addresses RPA which bears a one-to-one correspondence to the section indices SX and page indices PX in the logical address sections. For example, in a physical address section which is paired with a logical address section containing a section index SXn (SXm, SXi) and a page index PXn (PXm, PXi), a real page address RPAn (RPAm, RPAi) that has a one-to-one correspondence with the section index SXn, (SXm, SXi) and page index PXn (PXm, PXi) is stored. These logical address sections and physical address sections in the address converting buffer 8 form an address converting table used to determine a real page address from the indices in the logical address LADRS. The address converting table in the address converting buffer 8 can be written with new conversion information. In other words, the address converting buffer 8 has a kind of read-write memory (buffer means).

Figure 5:
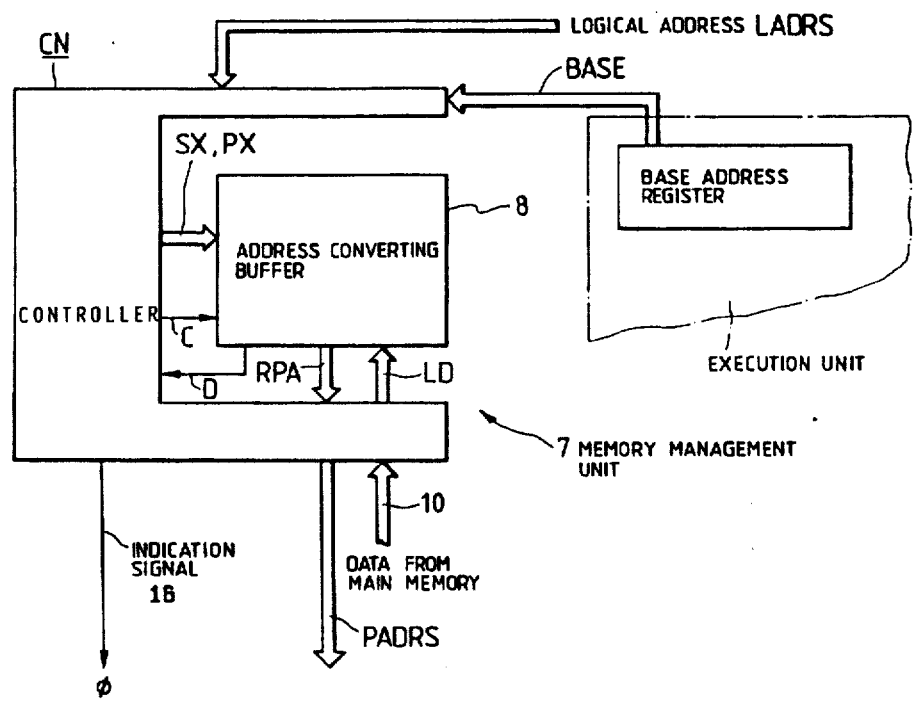
FIG. 5 is a block diagram of the memory management unit; 1

FIG. 5 shows a functional block diagram for the memory management unit 7. The memory management unit 7 includes the address converting buffer 8 and the controller CN, and also a read-write memory in which to store a number of pairs of the logical address section and the physical address section.

The controller CN receives the logical address LADRS, the base address BASE from a base address register in the execution unit, data (page table address, real page address) LD from the main memory 10 through the input/output control unit 6, and a detection signal D, and outputs to the address converting buffer 8 the section index SX, the page index PX and the control signal C.

If the logical address information corresponding to the section index SX and page index PX in the logical address LADRS exists in the address converting buffer 8, the address converting buffer 8 outputs to the controller CN the real page address RPA corresponding to the logical address information. The controller CN adds the offset OT contained in the logical address LADRS to the real page address RPA to determine the physical address, which it outputs as PADRS.

When the logical address information corresponding to the section index SX and page index PX in the logical address LADRS is not found in the address converting buffer 8, the controller CN recognizes the absence of the pertinent logical address information by the reception of the detection signal and, from the section index SX and the base address BASE, generates an address signal for accessing the section table ST in the main memory 10. At the same time, the controller CN asserts an indication signal $\phi$ 16. The address signal to access the section table ST is output as PADRS on the address bus AB to the main memory 10. The controller CN adds the page index PX to the page table address read from the section table ST in the main memory 10 to form an address signal for accessing the page table PT in the main memory 10. The address signal for accessing the page table PT is output as PADRS on the address bus AB to the main memory 10. A real page address read from the page table in the main memory 10 is added, by the controller CN, with the offset OT in the logical address LADRS to form a physical address for accessing the main memory 10, which is output as PADRS from the controller CN. In this embodiment, the indication signal $\phi$ 16 is negated at the timing that the controller CN accesses the page table PT in the main memory 10. The base address BASE in this embodiment can be changed arbitrarily by setting a desired value in the base address register in the execution unit 5. This allows one to change the address of the section table in the main memory 10.

Figure 4:
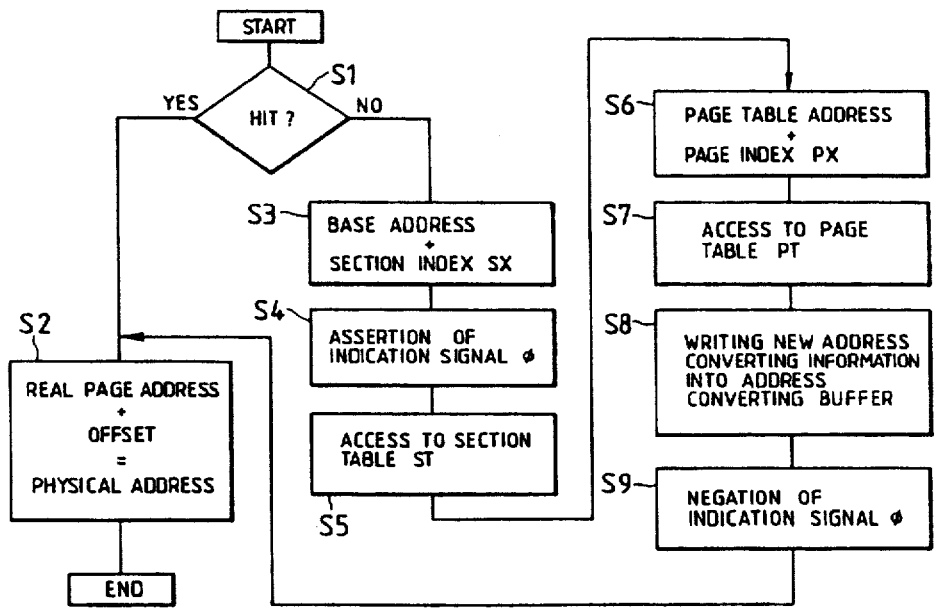
FIG. 4 is an operation flow diagram of a memory management unit.

FIG. 4 shows the operational sequence of the memory management unit 7.

Figure 6:
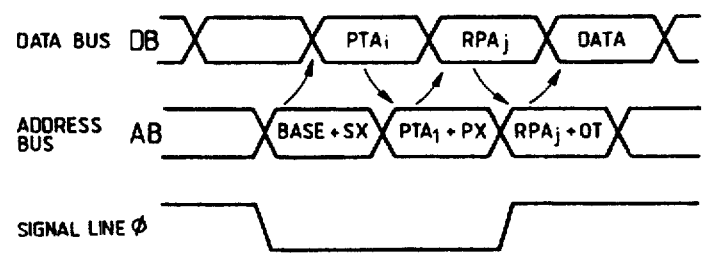
FIG. 6 shows a series of waveforms when the memory management unit accesses the main memory.

FIG. 6 shows waveforms in the data bus DB, the address bus AB 14 and in a signal line for the indication signal $\phi$ 16 when the memory management unit 7 accesses the section table ST and page table PT in the main memory 10.

Next, by referring to FIGS. 3 through 6, the operation of the memory management unit 7 is explained. When a logical address LADRS is sent from the instruction fetch unit 2 to the memory management unit 7 that has the address converting buffer 8, the memory management unit 7 uses the section index SX and page index PX in the logical address LADRS as search or reference information and makes an associative search over all table entries on the logical address sections in the address converting buffer 8 to see if there is any entry equal to the reference information (step S1 in FIG. 4). If an entry that coincides with the reference information exists (YES), the unit 7 picks up the real page address RPA paired with the entry and adds to it the offset OT in the logical address LADRS (step S2) to determine a physical address PADRS which the unit 7 outputs on the address bus AB 14.

If, on the other hand, there is no entry in the address converting buffer 8 that corresponds to the reference information of the logical address LADRS (NO), the memory management unit 7 first takes the section index SX in the logical address LADRS as offset address information with respect to the base address BASE and adds it to the base address BASE (step S3) to form or generate an address signal. By using this address signal the unit 7 accesses the main memory 10 and at the same time asserts the indication signal $\phi$ 16 holding it low (step S4, S5). This access causes the page table address corresponding to the section index SX, say PTAi, to be read from the section table ST out on the data bus DB and into the memory management unit 7. Next, the unit 7 uses the page index PX of the logical address LADRS as offset address information for the page table address PTAi and adds it to the page table address PTAi (step S6) to form an address signal. The address signal is output on the address bus AB 14 for the unit 7 to access the main memory 10 (step S7). This access causes the real page address corresponding to the page index PX, say RPAj, to be read from the page table PTi out on the data bus DB and into the memory management unit 7. With the real page address RPAj taken in, the memory management unit 7 now generates new conversion information from the section index SX and page index PX of the logical address LADRS and the corresponding real page address RPAj, and stores the newly formed conversion information in the address converting buffer 8 as a new entry in the address conversion table (step S8). Then the unit 7 negates the indication signal $\phi$ 16 (step S9) and adds the offset OF in the logical address LADRS to the real page address RPAj (step S2) to produce a final physical address PADRS.

In this way, when accessing the main memory 10 to set new conversion information in the address converting buffer 8, the memory management unit 7 outputs to an external circuit an indication signal $\phi$ specifying the timing at which to access the main memory 10. The indication signal $\phi$ is fed to a bonding pad or electrode BP 18 on the chip of the data processor 1. As is well known in conventional electronics a bonding pad is solder or some other type of conductive connection at the point where a component is connected. The bonding pad BP is connected to an external terminal (pin) provided to the package of the data processor 1. Therefore, the indication signal $\phi$ generated by the memory management unit 7 is output to the outside of the data processor 1 through the bonding pad BP 18 and the external terminal. The indication signal $\phi$ 16 is asserted (held low) at a specified timing when the memory management unit 7 accesses the section table ST and the page table PT in the main memory 10. The signal $\phi$ 16 is negated at a timing that the real page address RPA is taken from the page table PT into the address converting buffer 8.

In this embodiment, the indication signal $\phi$ is supplied to the emulator 20. The emulator 20 has an emulation controller 24, a breakpoint controller 26, a trace memory 21, an emulation memory port 28, and a master processor 30 that controls the entire working of the emulator. The emulator 20 performs such functions as emulation, real time tracing, breaking, memory, and debugging. Except for the master processor, each of the above component circuits of the emulator 20 is formed by a number of semiconductor integrated circuits. Therefore, the emulator 20 may, for example, be formed on a printed circuit board.

While performing emulation on a system developed by a user, the emulator 20 stores the states of the user system. That is, it receives addresses, data, the indication signal $\phi$ 16 and various other control signals that occur during each bus cycle and stores them in a first trace memory 21A in the trace memory 21 in a chronological order. While the indication signal $\phi$ 16 is being asserted, the data on the address bus AB 14 and data bus DB 12 are also taken into a second trace memory 21B of the trace memory 21 in a chronological order.

Hence, when new conversion information is set in the address converting buffer 8, the following four data are stored chronologically in the second trace memory 21B as shown in FIG. 6: an address signal (BASE+SX) which is obtained by taking the section index SX in the logical address LADRS as offset address information with respect to the base address BASE and which is output on the address bus AB to get a page table address PTA corresponding to the section index SX from the section table ST; a page table address (PTAi) which is output on the data bus DB from the section table ST in response to the address signal (BASE+SX); an address signal (PTAi+PX) which is obtained by taking the page index PX in the logical address LARDS as offset information with respect to the page table address PTAi and which is output on the address bus AB to get a real page address RPA corresponding to the page index PX from the page table PT; and a real page address (RPAj) which is output on the data bus DB from the page table PT in response to the address signal (PTAi+PX).

In this way, the information taken into the second trace memory 21B while the indication signal $\phi$ 16 is asserted includes at least the conversion information that is newly written in the address converting buffer 8 during this period. That is, all the information associated with the conversion information newly set in the address converting buffer 8 while the user system is being emulated is stored in the second trace memory 21B. In other words, when the data processor 1 uses the address converting buffer during emulation to generate a physical address PADRS from the logical address LADRS, all the information associated with the conversion information including the logical address section and physical address section used for the address conversion process can be stored in the second trace memory 21B external to the data processor 1.

The emulator 20 or a console not shown has an address disconverting table 22. In this embodiment, as shown in FIG. 1, the address disconverting table 22 is provided in the emulator 20. Disconversion information making up the address disconverting table 22 consists of data that is stored in the second trace memory 21B. Generation of the disconversion information may be carried out during a brake after the emulation is completed.

The process of generating the disconversion information that makes up the address disconverting table 22 is almost reverse to the address conversion process which is shown in FIG. 2. That is, the real page address RPA that is taken into the second trace memory 21B while the indication signal $\phi$ 16 is asserted is now the entry of the address disconverting table 22. The page index PX is obtained by taking the difference between the address signal, which was used to retrieve the real page address RPA, and the page table address PTA—data that was output on the data bus DB 14 before the real page address RPA was output on the data bus DB. The section index SX is obtained by taking the difference between the address signal, which was output on the address bus AB to retrieve the page table address PTA from the main memory 10, and the base address BASE set in the base address register. The section index SX and page index PX obtained through the above processing constitute information (logical address section) paired with the corresponding real page address (physical address section), the real page addresses being used as entries of the address disconversion table 22. By performing this processing every time the indication signal $\phi$ is asserted, it is possible to obtain a plurality of conversion information that is newly produced and set in the address converting buffer 8 during emulation.

The address discoverting table 22 thus formed is used to convert the physical addresses PADRS stored chronologically in the first memory trace 21A into the logical addresses LADRS.

Figure 7:
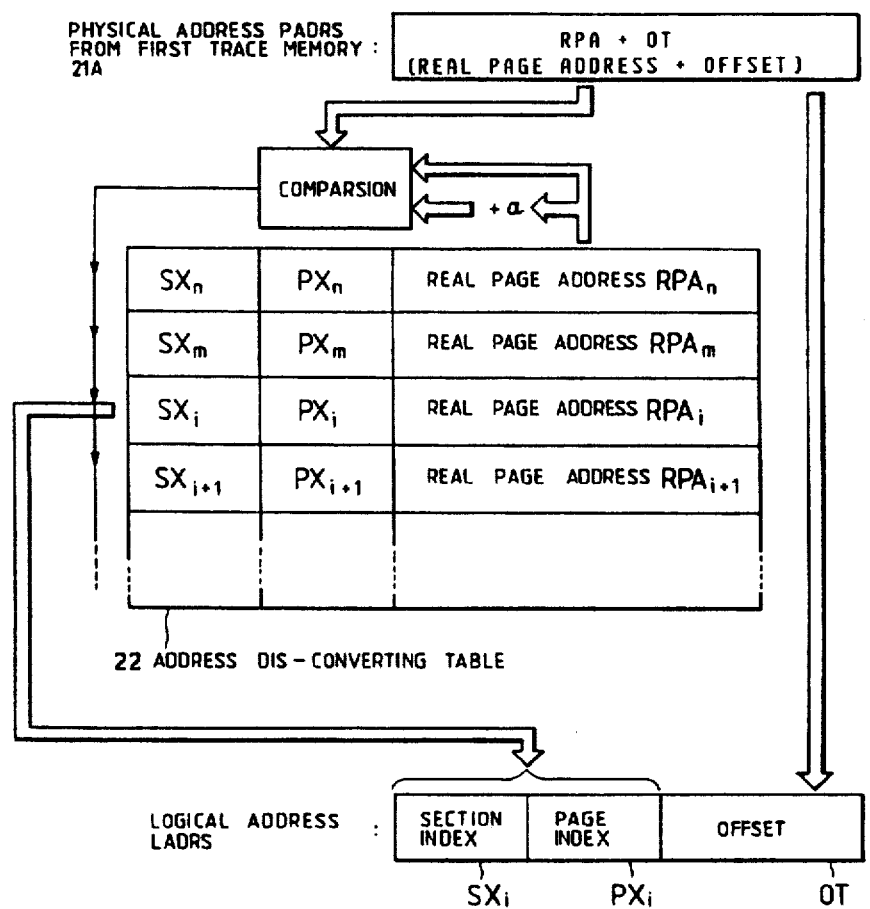
FIG. 7 is a diagram showing the process of disconversion by using an address disconverting table.

The relation between the real page addresses RPAn, ... RPAi+1, ... —entry information on the address disconverting table—and the physical addresses PADRS which are read from the first trace memory 21A to be converted into the logical addresses is as follows. If the size of a page frame (the size of a memory space provided by one page) is fixed, the relation can be known by checking whether a physical address PADRS in question is contained in a fixed page size which has the real page address RPA as its starting address. That is, when disconversion information necessary for converting a physical address PADRS into a logical address LADRS is searched from the address disconverting table 22, the target disconversion information can be obtained by identifying whether the physical address PADRS to be converted into the logical address LADRS is included in the range of a fixed page size which has the real page address RPA as a starting address. For example, as shown in FIG. 7, comparison is made to check whether the physical address PADRS is within a range starting from the real page address RPAn contained in the address disconverting table and ending with a page address which is given by adding the real page address RPAn with the fixed page size ($\alpha$). If the physical address PADRS is not contained within this range, the same process is repeated to check if it is within the next range between the address RPAm and RPAm+$\alpha$. This process is repeated for successive ranges until the physical address is found in a range. When, for instance, a physical address PADRS is found to be contained in a range between a real page address RPAi and an address RPAi+$\alpha$, a section index SXi and a page index PXi that together correspond to the real page address RPAi are taken as the section and page indices of the logical address LADRS. Then, the difference between the physical address PADRS and the real page address RPAi is taken to be an offset of the logical address LADRS.

As explained in the above, when pertinent disconversion information corresponding to the physical address LADRS has been found in the address disconverting table 22, the difference or offset between the real page address RPA in the detected disconversion information and the physical address PADRS to be disconverted is taken as an offset in the logical address LADRS. And the section index SX and the page index PX contained in that disconversion information are used as a section index SX and a page index PX, respectively, of the logical address LADRS. In this way, a physical address PADRS is disconverted into a logical address LADRS. The physical addresses PADRS stored in the first trace memory 21A are successively changed into the logical addresses LADRS. The logical addresses LADRS thus disconverted are displayed on a console (not shown) chronologically so that they can be used for debugging a user-developed system.

The above embodiment has the following advantages.

(1) The memory management unit 7, when it accesses the main memory 10 to set newly generated conversion information in the address converting buffer 8, asserts an indication signal $\phi$ 16 informing the external circuit of the access timing. An external circuit such as an emulator 20 that receives the indication signal $\phi$ successively stores all information associated with the newly generated conversion information placed in the address converting buffer 8. By using the stored information, the external circuit can generate disconversion information and set them in the address disconverting table 22.

(2) By using the address disconverting table 22 formed as mentioned in (1), it is possible for the external circuit to change the physical addresses PADRS output from the data processor 1 into logical addresses LADRS.

(3) Because of (2), the logical addresses LADRS which are required for debugging software can be obtained indirectly at the external circuit outside the data processor, which has a built-in address converter. This eliminates the need for another processor dedicated for evaluation which directly outputs the logical addresses LADRS. Also since there is no need to provide a special emulator to parallelly control the evaluation-dedicated data processor and the data processor which replaces a target processor and produces physical addresses PADRS, the software debugging of a system that has a data processor 1 with a built-in address converter can be implemented with a simple configuration and carried out with ease.

(4) In the data processor 1 with a built-in address converter, a configuration for indirectly obtaining at the external circuit the logical addresses LADRS required for software debugging is implemented by a function of outputting the indication signal $\phi$ 16. This configuration is much simpler than that of a special evaluation-dedicated data processor that outputs the logical addresses LADRS. Moreover, since the only difference from the real chip data processor is the function to output the indication signal $\phi$ 16 to the external circuit, the data processor chip can be used either as a real chip or as an evaluation chip by simply changing the package.

(5) The data processor 1 does not require a plurality of external terminals to output the logical address signals in addition to the physical address signals. But it only requires an external terminal to output the indication signal $\phi$. This keeps the data processor 1 from becoming expensive.

In the foregoing, we have explained the preferred embodiment of the invention and it should be noted that the invention is not limited to the above embodiment alone and that various changes may be made without deviating the spirit of the invention.

For example, while in the above embodiment the logical address space consists of sections and page frames, it may be formed of pages or segments. This means that the configuration of the logical address space and the table configuration in the address converting buffer can be changed as needed according to the modified concept of the logical address space.

Also, in the above embodiment the indication signal $\phi$ 16 is directly supplied to an external circuit from the memory management unit through an external terminal of the data processor 1. The indication signal $\phi$ 16 may be fed to the outside circuit through the input/output control unit and the external terminal of the data processor 1. While the data processor 1 has been explained as a processor which takes the place of a target processor during emulation, the data processor can not only be used for emulation but it can also be applied as is in a user-developed system. If the indication signal $\phi$ is not required by the system operation, the bonding pad BP 18 (electrode) formed on the chip of the data processor 1 to feed the indication signal φ to the outside may not be connected to the external terminal. In that case, it is possible to use a package with no external terminal to output the signal φ to the outside.

In the above embodiment the indication signal φ is kept asserted while the memory management unit 7 is accessing the main memory 10 to retrieve pertinent conversion information. The indication signal φ may be asserted temporarily only when the unit 7 accesses the memory 10.

Although the above description has explained the invention as applied to a data processor with a built-in address converter, from which our invention originated, the invention is not limited to this application alone but can be widely applied to data processors which have various other kinds of information converters. This invention can at least be applied to those data processors with a built-in information converter which has a conversion table into which externally supplied conversion information can be written and which, by referring to the conversion table, converts internal information into external information and outputs the converted external information to external circuits.

Typical advantages brought about by this invention are briefly summarised in the following.

When new conversion information is set in the conversion table by accessing the external memory, an indication signal representing the memory access timing is output to the external circuit. In response to the indication signal, information including the new conversion information set in the converting table is stored in the external circuit. The stored information is then used to generate a disconversion table in the external circuit to disconvert or reconvert into internal information the converted information fed from the information converting means to the external circuit. The above configuration makes it possible to easily disconvert at the external circuit the converted information output to the external circuit into internal information. This eliminates the need to directly output to the external circuit the internal information that existed before being converted by the information converter.

What is claimed is:

1. A data processing system for debugging software, the system comprising:
   a main memory for receiving logical and physical address data;
   a data bus;
   a data processor in communication with the main memory through the data bus, said data processor including:
   (i) a memory management unit for converting logical address data to physical address data,
   (ii) a means for generating an indication signal representing an access of the main memory by the data processor wherein, said indication signal is generated upon detection that selected logical address data is absent from the memory management unit; and
   an emulator in communication with an address bus, said emulator including:
   (i) a means for storing address conversion information from the data bus,
   (ii) a means for converting physical address data to logical address data; and
   an electrode means for directly transmitting the indication signal from the memory management unit of the data processor to the emulator, the indication signal enabling the emulator to access the physical address data from the address bus and permitting the storage of newly generated address conversion information in the address conversion information storing means for conversion of physical address data to logical address data by the converting means of the emulator.

* * * * *